United States Patent
Batho

(10) Patent No.: US 9,839,966 B2
(45) Date of Patent: Dec. 12, 2017

(54) QUICK-RELEASE ARBOR FOR HOLE SAW

(71) Applicant: Malco Products, Inc., Annandale, MN (US)

(72) Inventor: Thomas A. Batho, South Haven, MN (US)

(73) Assignee: Maclo Products, Inc., Annandale, MN (US)

( * ) Notice: Subject to any disclaimer, the term of this patent is extended or adjusted under 35 U.S.C. 154(b) by 217 days.

(21) Appl. No.: 15/003,203

(22) Filed: Jan. 21, 2016

(65) Prior Publication Data

US 2016/0279717 A1    Sep. 29, 2016

Related U.S. Application Data

(60) Provisional application No. 62/139,018, filed on Mar. 27, 2015.

(51) Int. Cl.
*B23B 51/04*    (2006.01)

(52) U.S. Cl.
CPC ...... *B23B 51/0473* (2013.01); *B23B 51/0426* (2013.01); *B23B 2251/606* (2013.01); *Y10T 408/895* (2015.01); *Y10T 408/95* (2015.01)

(58) Field of Classification Search
CPC . B23B 51/0473; B23B 51/0426; B23B 51/04; B23B 51/05; Y10T 408/895; Y10T 408/8953; Y10T 408/8957; Y10T 408/896; Y10T 408/8967; Y10T 408/8973; Y10T 408/94; Y10T 408/95; Y10T 408/953; Y10T 408/957

See application file for complete search history.

(56) References Cited

U.S. PATENT DOCUMENTS

| | | | | |
|---|---|---|---|---|
| 6,572,311 B2 * | 6/2003 | Vasudeva | ............ | B23B 31/005 408/226 |
| 7,934,893 B2 | 5/2011 | Gillissen | | |
| 9,550,237 B2 * | 1/2017 | Keightley | ............ | B23B 31/005 |

FOREIGN PATENT DOCUMENTS

| | | | | |
|---|---|---|---|---|
| DE | 19740277 A1 * | 3/1999 | ........ | B23B 51/0473 |
| DE | 202016005218 U1 * | 9/2016 | | |
| NL | 2003834 C * | 5/2011 | ............ | B23B 31/07 |
| WO | WO 2012121601 A1 * | 9/2012 | | |
| WO | WO 2014178718 A1 * | 11/2014 | ........ | B23B 51/0453 |
| WO | WO 2016068722 A1 * | 5/2016 | ............ | B23B 51/04 |
| WO | WO 2017024814 A1 * | 2/2017 | ............ | B23B 51/04 |

* cited by examiner

*Primary Examiner* — Daniel Howell
(74) *Attorney, Agent, or Firm* — Briggs and Morgan, P.A.; Gerald E. Helget

(57) ABSTRACT

A quick-release arbor is adapted for a cylindrical hole saw that has a bottom wall having a threaded central aperture and opposing indexing holes. The arbor has a central hexagonal passage with opposing key slots passing therethrough and a threaded hole saw fitting axially aligned with the hexagonal passage. The arbor has a hexagonal pilot shaft securely holding a pilot drill bit and intermediate opposing keys forming a position lock. The pilot shaft is adapted to freely pass through the passage. Within the arbor is a button chamber that is transverse to the hexagonal passage with a rear wall. A biased button is located within the button chamber having upper and lower cuts outs to permit the pilot shaft to freely pass through the cut outs of the button when the button is depressed and having rear pocket to capture one of the pilot shaft opposing keys when the button is released.

11 Claims, 4 Drawing Sheets

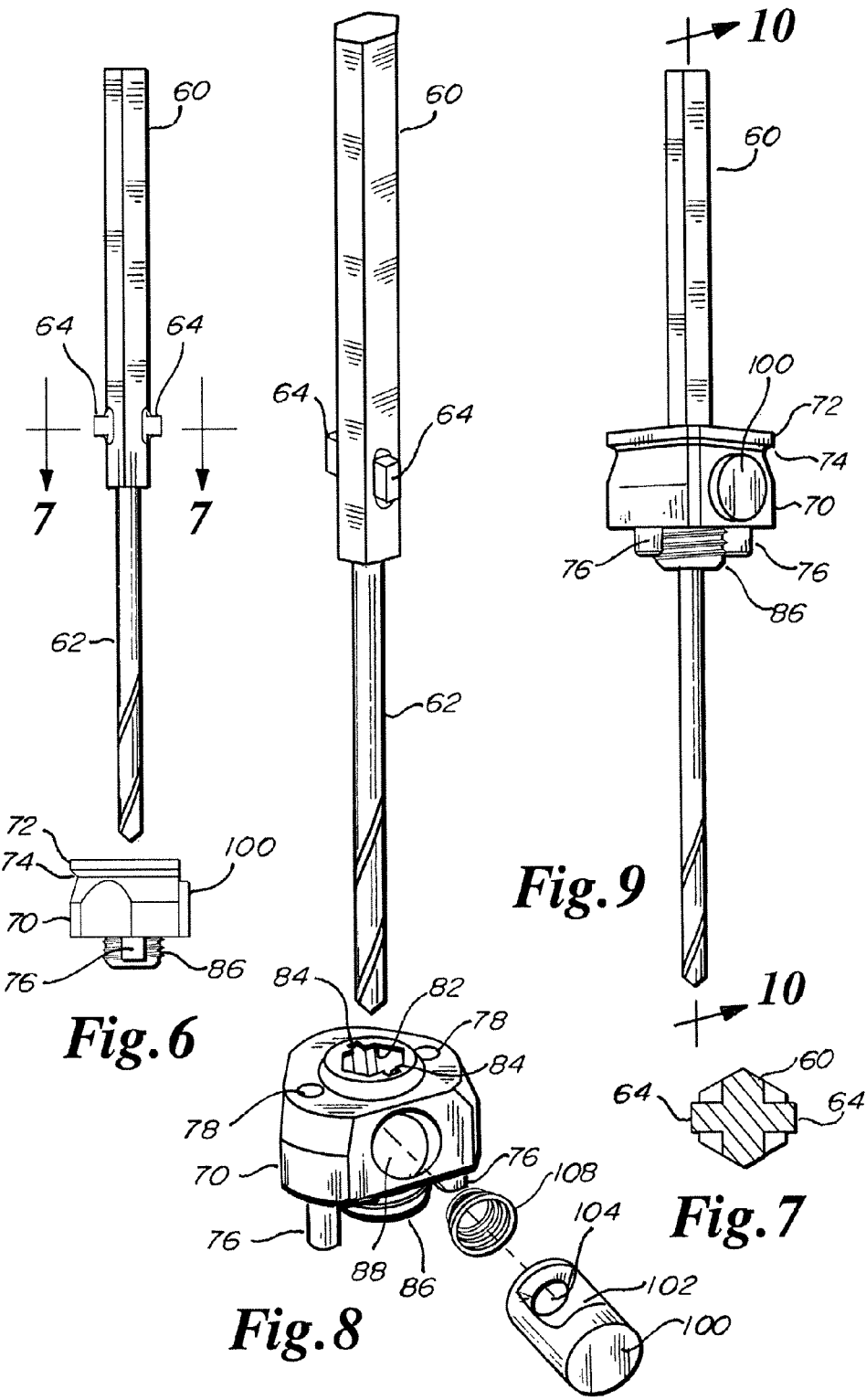

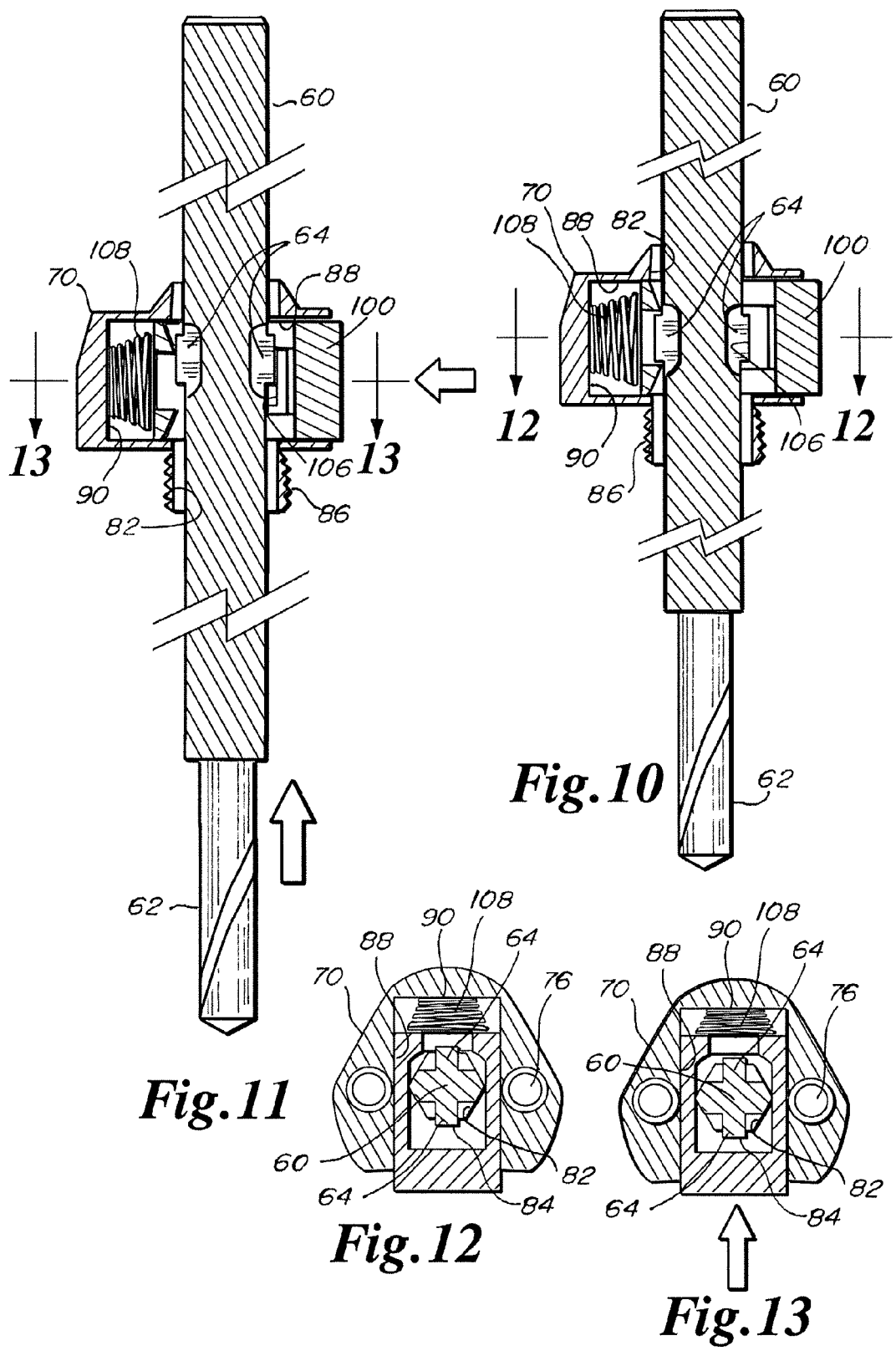

QUICK-RELEASE ARBOR FOR HOLE SAW

PRIORITY

This application is a continuation-in-part of U.S. Provisional Patent Application Ser. No. 62/139,018, filed Mar. 27, 2015 entitled Quick Release Arbor System.

BACKGROUND OF THE INVENTION

The present invention relates to arbor-mounted hole saws, and more particularly to a quick-release arbor for receiving multiple sized pilot drill bits press fit into pilot shafts.

A hole saw is a saw blade of annular shape, whose annular kerf creates a hole in the workpiece without having to cut up the core material. It is used in a drill. Hole saws typically have a pilot drill bit at their center to keep the saw teeth from walking. The fact that a hole saw creates the hole without needing to cut up the core often makes it preferable to twist drills or spade drills for relatively large holes (especially those larger than 25 millimeters (1.0 inch)). The same hole can be made faster and uses less power.

The depth to which a hole saw can cut is limited by the depth of its cup-like shape. Most hole saws have a fairly short aspect ratio of diameter to depth, and they are used to cut through relatively thin workpieces. However, longer aspect ratios are available for applications that warrant them.

The hole saw consists of a metal cylinder, usually steel, mounted on an arbor. The cutting edge either has saw teeth formed in it or industrial diamonds embedded in it. The arbor can carry a drill bit to bore a centering hole. After the first few millimeters of cut, the centering mechanism may no longer be needed, although it will help the bit to bore without wandering in a deep hole. The sloping slots in the cylinder wall help carry the dust out. The kerf of the cut is designed to be slightly larger than the diameter of the rest of the hole saw so that it does not get jammed in the hole.

Holes saws for use with portable drills are commonly available in diameters from 6 to 130 mm (0.24 to 5.12 in). The only limit on the length of the cylinder, and thus depth of the hole, is the need to remove the bit from the hole to clear dust. A 300 millimeters (12 in) cylinder length is not uncommon, although shorter bits are usual. By breaking the core off from time to time and using a shank extension, a diamond core drill can drill to depths many times its length.

Saw teeth are used for most materials, such as wood, plastic, soft plaster, and metal. Diamond hole saws are used to bore holes in brick, concrete, glass, tile, porcelain tiles, granite, marble, or any lapidary material and stone. Not all materials to be drilled are suitable for dry drilling. Very hard materials like reinforced concrete normally should be drilled with water, otherwise the excessive heat generated during the drilling process may cause the diamonds on the core bit to become blunt, and then lead to poor drilling performance.

The main advantage over conventional drill bits is the hole saw's efficiency, because very little of the total material being removed is actually cut, which ultimately reduces the overall power requirement. Another advantage over drill bits is the wider size capability. For example, a 100 millimeters (3.9 inches) hole would require a huge twist drill or spade drill, unable to be properly driven by a pistol-grip drill or benchtop drill press; but it can be cut with a hole saw with relative ease.

Referring to prior art FIGS. 1 through 3, the parts and operation of a traditional hole saw 26 maybe understood. A hexagonal pilot shaft 10 fits into a drill or drill press (not shown) and the pilot shaft supports a pilot drill bit 12 which is typically press fit into the other end of the pilot shaft 10. The pilot shaft 10 is then passed through a hexagonal central passage and securely mounted within the arbor 14 by a threaded key hole and set screw 16 bearing down upon the pilot shaft 10. Biased axially moveable (along arrows A) collar 18 has depending hole saw index pins 20. Below the pins 20 is threaded hole saw male fitting 22. The hole saw 26 is cylindrical with teeth 28 and a bottom wall 30. In bottom wall 30 is threaded central aperture or hole 32. Indexing locking holes 34 mate with arbor index pins 20. Sloping dust out slots 36 are provided to minimize clogging of the hole saw 26 in the work piece.

Once the pilot shaft 10 is secure in arbor 14, collar 18 is moved away from threaded fitting 22 moving index pins 20 out of the way for the threaded fitting to be threaded into hole saw 26 threaded central aperture 32. Thereafter, the collar is rotatably adjusted and released to secure pins 20 into locking holes 34. The arbor 14 and hole saw 26 are secured together for operation. This process can be time consuming. By this arrangement, the arbor 14 and hole saw 26 are not overtightened by operation of the tool.

Referring to FIGS. 4 and 5, one structure for a quick-change arbor 40 for a hole saw 38 maybe seen and is further disclosed in U.S. Pat. No. 7,934,893 and incorporated here by reference. Arbor 40 has a hexagonal central aperture 42 for a pilot shaft 44 with a pilot drill bit 46. The shaft 44 has an annular channel or notch 48. The arbor has a biased latch 50 mounted in the arbor 40 and pivotal on pin 52. Latch 50 is depressed as to align with annual channel 48 to be secured therein or to be released therefrom.

This style of hole saw 38 does not use indexing pins 20 and locking holes 34 to secure the hole saw 38 and arbor together 40. By this arrangement, the hole saw 38 and arbor 40 may be overtightened and difficult to separation when not in use. Also, the drill press or manual pressure that is exerted to advance the hole saw has a tendency to wear on the biased latch which can lead to failure.

There is a need for a quick-release arbor for a hole saw that secures, but does not allow overtightening, of the arbor to the hole saw with a finger grip on the axially movable collar for easy threading of the arbor into the hole saw.

SUMMARY OF THE INVENTION

A quick-release arbor is adapted for a cylindrical hole saw that has a bottom wall having a threaded central aperture and opposing indexing holes. The arbor has a central hexagonal passage with opposing key slots passing therethrough and a threaded hole saw fitting axially aligned with the hexagonal passage. The arbor has a hexagonal pilot shaft securely holding a pilot drill bit and intermediate opposing keys forming a position lock. The pilot shaft is adapted to freely pass through the passage. Within the arbor is a button chamber that is transverse to the hexagonal passage with a rear wall. A biased button is located within the button chamber having upper and lower cuts outs to permit the pilot shaft to freely pass through the cut outs of the button when the button is depressed and having rear pocket to capture one of the pilot shaft opposing keys when the button is released.

A principal object and advantage of the present invention is the secure vertical positioning of the pilot shaft within the arbor.

Another object and advantage of the present invention is that the position lock formed by opposing keys and rear pocket capturing one of the pilot shaft opposing keys, when the button is released, is not subject to premature failure.

Another object and advantage of the present invention is that the biased axially movable collar has a finger grip to move and keep the index pins away from the hole saw when threading the threaded hole saw fitting into the threaded central aperture in the bottom wall of the hole saw.

BRIEF DESCRIPTION OF THE DRAWINGS

FIG. 6 is an elevational view of the pilot shaft and arbor of the present invention;

FIG. 7 is a cross sectional view of the pilot shaft taken along lines 7-7 of FIG. 6;

FIG. 8 is a perspective view of the pilot shaft and exploded arbor of the present invention with the biased axially movable collar with indexing pins removed for ease of understand;

FIG. 9 is an elevational view of the assembled pilot shaft and arbor of the present invention;

FIG. 10 is a cross sectional view of the pilot shaft engaged with the arbor of the present invention taken along lines 10-10 of FIG. 9 with the biased axially movable collar and index pins removed for ease of understanding;

FIG. 11 is a cross sectional view of the pilot shaft and arbor with the button pressed to pilot shaft release position similar to FIG. 10 as taken along lines 10-10 of FIG. 9 with the biased axially movable collar and index pins removed for ease of understanding;

FIG. 12 is a cross sectional view of the pilot shaft engaged with the arbor of the present invention taken along lines 12-12 of FIG. 10;

FIG. 13 is a cross sectional view of the pilot shaft out of engagement with the arbor of the present taken along lines 13-13 of FIG. 11 with the button depressed;

DETAILED SPECIFICATION

Figures 1, 2, 3, 4, 5:
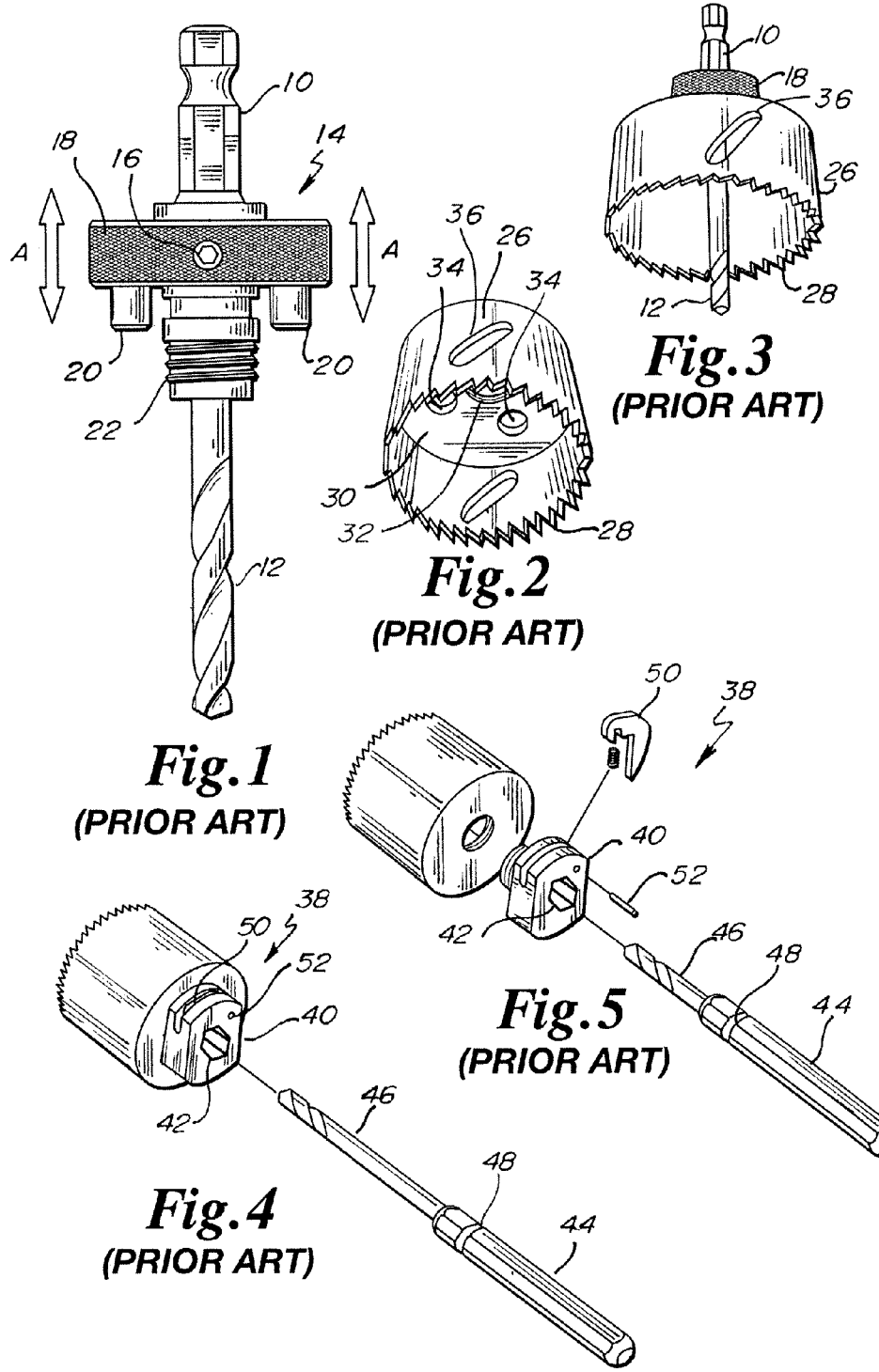
FIG. 1 is an elevational view of a prior art arbor and pilot shaft with drill bit.
FIG. 2 is a perspective view of a prior art hole saw.
FIG. 3 is a perspective view of a prior art hole saw with arbor.
FIG. 4 is a perspective view of the prior art hole saw of the '893 patent.
FIG. 5 is an exploded perspective view of the prior art hole saw of the '893 patent.

Referring to FIGS. 6-13, the pilot shaft 60 and quick-release arbor 70 of the present invention may be viewed and understood. Please note FIGS. 8, 10 and 11 have the biased axially movable collar 18 and index pins 20 removed for easy understanding of the arbor 70 structure.

Pilot shaft 60 is hexagonal in cross section as to secure the pilot shaft 60 from slippage when it is secured into a drill and within arbor 70. Distal of the hexagonal pilot shaft 60, a drill bit is press fit into the pilot shaft 60. Intermediate the pilot shaft are opposing keys 64 which form a position lock for the pilot shaft 60 within arbor. Keys 64 maybe formed by stamping the pilot shaft 60 before heat treatment.

Figures 14, 15, 16:
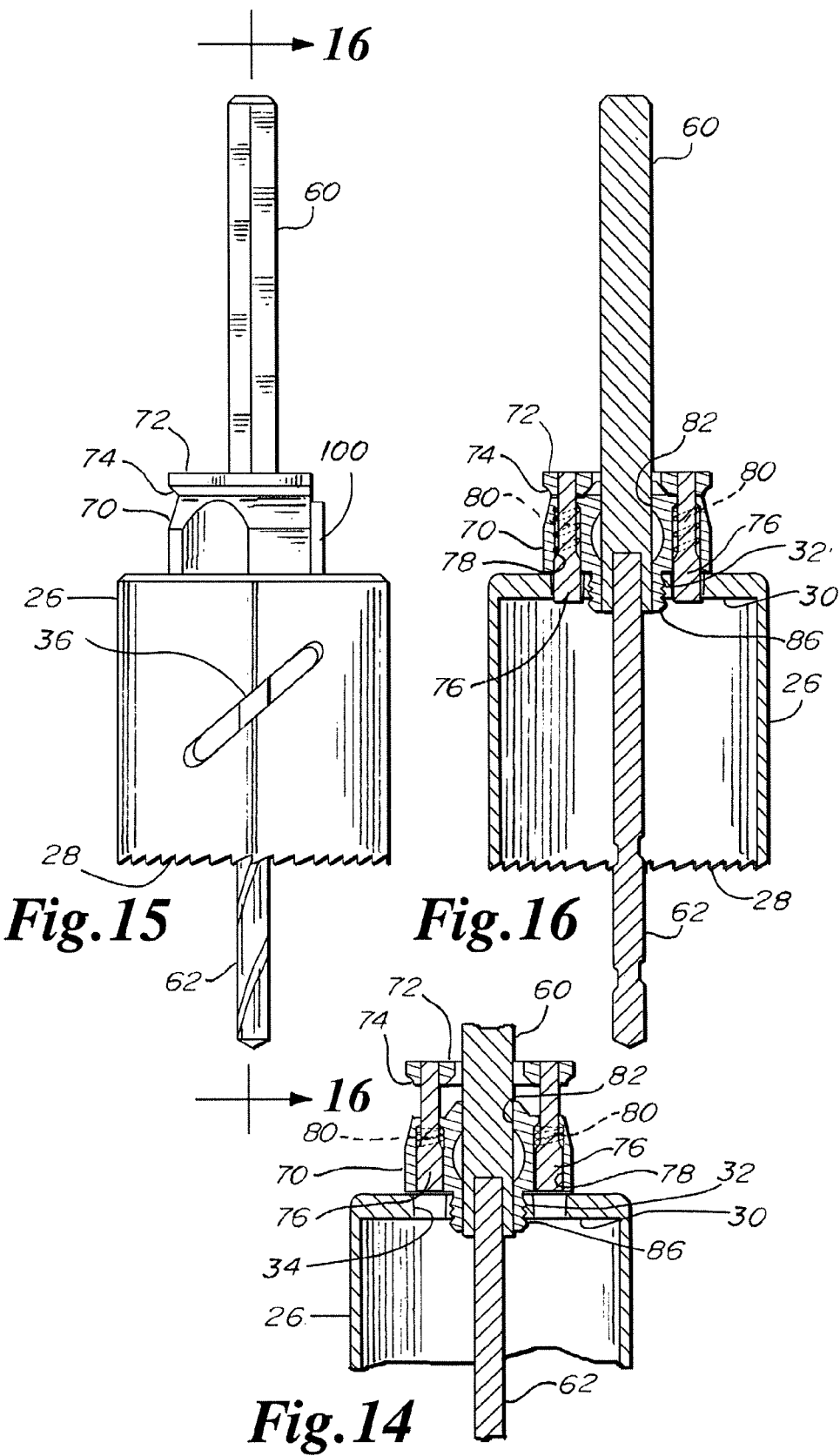
FIG. 14 is a cross sectional view of the pilot shaft engaged with the arbor and hole saw partially broken away with the biased movable collar and index pins moved away from the hole saw for threadably joining the arbor and hole saw.
FIG. 15 is an elevational view of the pilot shaft engaged with the arbor and hole saw.
FIG. 16 is a cross sectional view of the pilot shaft engaged with the arbor and hole saw taken along lines 16-16 of FIG. 15.

Arbor 70 has a biased axially movable collar 72 with a finger grip 74 for controlling the location of indexing pins 76. Pins 76 are located in arbor pin passages 78 and biased in their extended position by springs 80 (FIGS. 14 and 16).

Arbor 70 has a central hexagonal passage 82 axially therethrough for receipt of pilot shaft 60. Key slots 84 are provided in passage 82 for receipt of pilot shaft keys or position lock 64. Opposite the top of arbor 70 is threaded hole saw fitting or shaft 86 which is threadably engagable with threaded hole saw central aperture 32 in bottom wall 30. By this arrangement, pilot shaft 60 may pass freely through the central hexagonal passage 82 of arbor 70 when button 100 is depressed and which now will be explained.

In arbor 70 is button chamber 88 which is transverse of central hexagonal passage 82. At the distal end of chamber 88 is located rear wall or spring seat 90. Movable button 100 is press fit into chamber 88 after conical spring 108 is seated at rear wall 90. Conical springs are advantageous in that they will collapse upon themselves and require less longitudinal space for functionality. Button 100 has upper and lower (not shown) cut outs 102 to permit the pilot shaft 60 with keys 64 to pass therethrough without hindrance when the button 100 is depressed. At the opposite end of button 100 near spring seat rear wall 90 is located a circular pocket 104 which will index upon and hold one of the keys 64 of the position lock 64. Opposite circular pocket 104 is fixed pocket 106. Depressing button 100 moves circular pocket 104 out of engagement with one key 64 and allows for enough slack so that the second key 64 in fixed pocket 106 will easily disengage so that pilot shaft 60 can pass through central hex passage 82.

Referring to FIGS. 10-16, in operation, a particular size of pilot drill bit 62 is determined that has previously been press fit into the pilot shaft 60 for a particular size of hole saw 26. The arbor 70 is grasped with a finger or thumb on the button 100—which is depressed. The pilot shaft 60 with drill bit 62 is inserted into hexagonal central passage 82 with keys 64 aligned with key slots 84. When the key are approximately aligned with the circular pocket 104 and opposing fixed pocket 106, the button 100 is released and the operator can feel the pilot shaft 60 lock into the arbor 70. Next with one hand the arbor 70 is held while the finger grip 74 is engaged and lifted upwardly to move the indexing pins 76 out of the arbor pin passages 78. The hole saw 26 is grasped with the other hand while the hole saw 26 has it threaded central aperture 32 threaded onto arbor threaded hole saw fitting 86. Once this is complete, the pins 76 are aligned and lowered into hole saw indexing/locking holes 34 to firmly secure the hole saw 25 to the arbor 70. This completed assembly has the pilot shaft 60 placed into the chuck of a drill press or hand drill and secured thereat. Thereafter, hole drilling maybe commenced.

After the hole drilling is complete, the chuck is opened and the arbor 70 and hole saw 26 is removed therefrom. Next, with one hand the arbor 70 is held while the finger grip 74 is engaged and lifted upwardly to move the indexing pins 76 out of the arbor pin passages 78 of hole saw 26. The hole saw 26 is then grasped with the other hand while the hole saw 26 is rotated and has it threaded central aperture 32 threaded off of arbor threaded hole saw fitting 86. The hole saw 26, pilot shaft 60 and arbor 70 may then be properly stored.

The above specification and attached Figures are for illustrative purposes only. The true scope of this invention is defined in the following claims.

What is claimed:

1. A quick-release arbor for a cylindrical hole saw with bottom wall having a threaded central aperture and opposing indexing holes and a hexagonal pilot shaft securely holding a pilot drill bit, comprising:
   a) intermediate opposing keys on the pilot shaft forming a position lock;
   b) the arbor having a central hexagonal passage with opposing key slots passing therethrough and a threaded hole saw fitting axially aligned with the hexagonal passage, the pilot shaft adapted to freely pass through the passage;
   c) a button chamber within the arbor transverse to the hexagonal passage with a rear wall; and
   d) a biased button within the button chamber having upper and lower cuts outs to permit the pilot shaft to freely pass through the cut outs of the button when the button is depressed and having rear pocket to capture one of the pilot shaft opposing keys when the button is released.

2. The quick-release arbor for a cylindrical hole saw and the hexagonal pilot shaft of claim 1, further comprising a spring in the chamber between the rear wall and button adapted to hold the button to the position lock to secure the pilot shaft within the arbor.

3. The quick-release arbor for a cylindrical hole saw and the hexagonal pilot shaft of claim 1, further comprising a biased axially movable collar on the arbor with a finger grip and indexing pins passing through the arbor.

4. The quick-release arbor for a cylindrical hole saw and the hexagonal pilot shaft of claim 3 wherein the indexing pins carry springs within the arbor to bias the pins into an extended position out of the arbor.

5. A quick-release arbor for a cylindrical hole saw with bottom wall having a threaded central aperture and opposing indexing holes and a hexagonal pilot shaft securely holding a pilot drill bit, comprising:
   a) intermediate opposing keys on the pilot shaft forming a position lock;
   b) the arbor having a central hexagonal passage with opposing key slots passing therethrough and a threaded hole saw fitting axially aligned with the hexagonal passage, the pilot shaft adapted to freely pass through the passage;
   c) a button chamber within the arbor transverse to the hexagonal passage with a rear wall;
   d) a biased button within the button chamber having upper and lower cuts outs to permit the pilot shaft to freely pass through the cut outs of the button when the button is depressed and having rear pocket to capture one of the pilot shaft opposing keys when the button is released; and
   e) a spring in the chamber between the rear wall and button adapted to hold the button to the position lock to secure the pilot shaft within the arbor.

6. The quick-release arbor for a cylindrical hole saw and the hexagonal pilot shaft of claim 5, further comprising a biased axially movable collar on the arbor with a finger grip and indexing pins passing through the arbor.

7. The quick-release arbor for a cylindrical hole saw and the hexagonal pilot shaft of claim 6 wherein the indexing pins carry springs within the arbor to bias the pins into an extended position out of the arbor.

8. A quick-release arbor for a cylindrical hole saw with bottom wall having a threaded central aperture and opposing indexing holes and a hexagonal pilot shaft securely holding a pilot drill bit, comprising:
   a) intermediate opposing keys on the pilot shaft forming a position lock;
   b) the arbor having a central hexagonal passage with opposing key slots passing therethrough and a threaded hole saw fitting axially aligned with the hexagonal passage, the pilot shaft adapted to freely pass through the passage;
   c) a button chamber within the arbor transverse to the hexagonal passage with a rear wall;
   d) a biased button within the button chamber having upper and lower cuts outs to permit the pilot shaft to freely pass through the cut outs of the button when the button is depressed and having rear pocket to capture one of the pilot shaft opposing keys when the button is released; and
   f) a biased axially movable collar on the arbor with a finger grip and indexing pins passing through the arbor wherein the indexing pins carry springs within the arbor to bias the pins into an extended position out of the arbor.

9. The quick-release arbor for a cylindrical hole saw and the hexagonal pilot shaft of claim 8, further comprising a spring in the chamber between the rear wall and button adapted to hold the button to the position lock to secure the pilot shaft within the arbor.

10. A quick-release arbor for a cylindrical hole saw with bottom wall having a threaded central aperture and opposing indexing holes and a hexagonal pilot shaft securely holding a pilot drill bit, comprising:
    a) intermediate opposing keys on the pilot shaft forming a position lock;
    b) the arbor having a central hexagonal passage with opposing key slots passing therethrough and a threaded hole saw fitting axially aligned with the hexagonal passage, the pilot shaft adapted to freely pass through the passage;
    c) a button chamber within the arbor transverse to the hexagonal passage with a rear wall;
    d) a biased button within the button chamber having upper and lower cuts outs to permit the pilot shaft to freely pass through the cut outs of the button when the button is depressed and having rear pocket to capture one of the pilot shaft opposing keys when the button is released;
    e) a spring in the chamber between the rear wall and button adapted to hold the button to the position lock to secure the pilot shaft within the arbor; and
    f) a biased axially movable collar on the arbor with a finger grip and indexing pins passing through the arbor wherein the indexing pins carry springs within the arbor to bias the pins into an extended position out of the arbor.

11. The quick-release arbor for a cylindrical hole saw and the hexagonal pilot shaft of claim 10 wherein the indexing pins carry springs within the arbor to bias the pins into an extended position out of the arbor.

* * * * *